United States Patent [19]

Edelman et al.

[11] Patent Number: 4,822,843

[45] Date of Patent: Apr. 18, 1989

[54] POLYSILOXANE-MODIFIED POLYIMIDESULFONE OR POLYIMIDEKETONE MOLDING COMPOSITION

[75] Inventors: Robert Edelman, Staten Island, N.Y.; Lincoln Ying, Bridgewater, N.J.

[73] Assignee: M&T Chemicals Inc., Rahway, N.J.

[21] Appl. No.: 160,456

[22] Filed: Feb. 25, 1988

Related U.S. Application Data

[63] Continuation-in-part of Ser. No. 54,352, May 26, 1987, abandoned.

[51] Int. Cl.$^4$ ............................................... C08K 3/40
[52] U.S. Cl. .................................... 524/494; 524/496; 524/439; 524/588; 524/600; 525/425; 528/26
[58] Field of Search .......................... 528/26; 525/425; 524/494, 496, 588, 600, 439

[56] References Cited

U.S. PATENT DOCUMENTS 4,395,527 7/1983 Berger ................................... 528/26
4,652,598 3/1987 Edelman ............................... 524/99

Primary Examiner—Melvyn I. Marquis
Attorney, Agent, or Firm—Stanley A. Marcus; Bernard Francis Crowe

[57] ABSTRACT

Polyimidesulfone and polyimideketone resins are rendered moldable while still retaining solvent resistance and high temperature physical and mechanical properties by incorporating an aromatic diaminopolysiloxane at a level between about 1 and about 20 mole % of the total diamine content, into the polymer.

23 Claims, No Drawings

POLYSILOXANE-MODIFIED POLYIMIDESULFONE OR POLYIMIDEKETONE MOLDING COMPOSITION

This application is a continuation-in-part of patent application Ser. No. 07/054,352, filed May 26, 1987, now abandoned, by the same inventors and assigned to the same assignee, as herein.

FIELD OF THE INVENTION

This invention relates to polyimides and more particularly to polysiloxane-modified polyimidesulfone and polyimideketone molding compositions.

BACKGROUND OF THE INVENTION

There is a continuing need in the field of engineering plastics for polymeric materials having good physical and mechanical properties at high temperatures, i.e., at about 200° C. and higher. In addition, thermoplastic rather than thermoset polymers are preferred. The latter requirement presents formidable problems since materials which are tailored to provide satisfactory high temperature properties more often than not also exhibit poor processing properties. Thus, although they are linear polymers and by definition thermoplastic, their rheology is such that they cannot be readily processed by thermoplastic molding methods.

It is known in the prior art that incorporation of polysiloxanes into polymeric compositions changes their properties. U.S. Pat. No. 4,395,527 (Berger), for example, qualitatively discloses that the concentration of siloxane in a polyimide affects the solubility, flexibility, elongation, impact resistance and UV resistance of the polyimide. In addition polysiloxanes lower the glass transition temperature (Tg) which facilitates processing and fabrication of high molecular weight materials. This reference prefers siloxane concentrations of 40 mole % or higher and does not discuss solvent resistance nor the effect of the nature of the polyimide on this property. No particular species of polyimide is given as preferred. There is no mention of the level of polysiloxane required to be added to a polyimide molecule to achieve polymer processability without detracting from solvent resistance. Berger does teach that high ratios of polysiloxane are preferred to impart solubility, the opposite of solvent resistance. However there is no teaching or suggestion that within the narrow limits of polysiloxane content of the polyimides defined in this invention that one can retain the desirable mechanical properties and particularly the excellent solvent resistance of the unmodified polyimidesulfone and polyimideketone resins while imparting processability to them sufficient to provide commercially acceptable molding compositions.

Based on a study of the prior art, it would be expected that adding a polysiloxane to a polyimide structure effects a reduction in the polyimide mechanical properties, such as, tensile strength and tensile modulus and an increase in the polyimide solubility in organic solvents.

A case in point is the polyimidesulfones disclosed in U.S. Pat. No. 4,489,027 (T. L. St. Clair et. al.) as the resultant product of equimolar quantities of 3,3',4,4'-benzophenonetetracarboxylic acid dianhydride and 3,3'-diaminodiphenylsulfone. These polyimidesulfones were designed to combine the processibility of the polysulfones with the solvent resistance of the polyimides.

The polyimidesulfones represented by the generic structure:

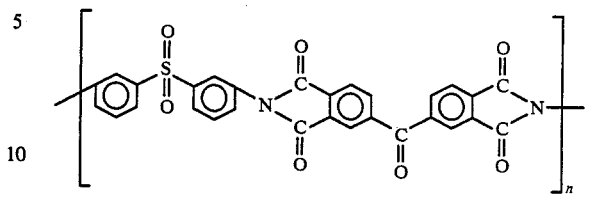

wherein n is an integer and represents up to several hundred repeating units, have extremely good mechanical properties, evinced for example by a modulus of 600,000 psi and a tensile strength of 10,000 psi, excellent thermal resistance and a Tg of 275° C. Despite the fact that they are amorphous, these materials exhibit unusually good resistance to solvents. Although they constitute an improvement in processability over that of the polyimides made from pyromellitic dianhydride and 4,4'-oxydianiline, processing problems still exist as disclosed by J. F. Dezern et. al. in NASA Technical Memorandum 86358 (1985) in terms of solvent retention and foaming. It has also been found that these polyimidesulfones are difficult to mold and prone to void production in the products or articles molded from them.

It is therefore an object of this invention to provide polysiloxane-modified polyimidesulfones and polyimideketones which exhibit good mechanical properties and solvent resistance and are readily processable.

It is another object to provide polysiloxane-modified polyimidesulfones and polyimideketones that can be molded into products free of voids.

It is also an object to provide polysiloxane-modified polyimidesulfones and polyimideketones which can be transfer molded into thin precision parts.

It is a further object to provide filled polysiloxane-modified polyimidesulfone and polyimideketone composites.

Other objects will become apparent to those skilled in the art upon a further reading of the specification.

SUMMARY OF THE INVENTION

The objects enumerated above have been achieved by amorphous, normally solid polysiloxane-modified polyimidesulfones and polyimideketones comprising repeating imidization radical residua of:

(1) a dianhydride having the generic formula:

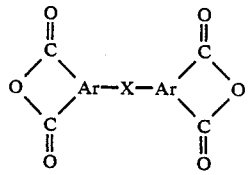

wherein

X is at least one of the following: $>C=O$, $-O-$, $-S-$, $-SO_2-$ or a valence bond; and Ar is an arylene group having 6 to 10 carbon atoms;

(2) a diaminodiaryl compound having the generic formula:

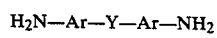

wherein Ar is as defined above and Y is —SO$_2$— or >C=O; and (3) a diaminopolysiloxane having the generic formula:

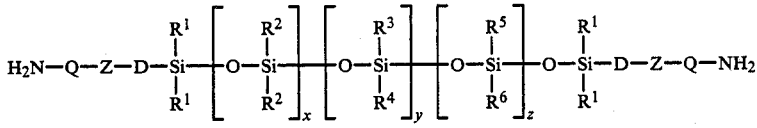

wherein

Q is a substituted or unsubstituted aromatic group,

Z is —O—, —S—, —SO—, —SO$_2$—, —SO$_2$NH—, —NHSO$_2$—,

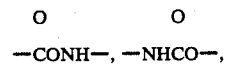

—C(O)O— or —OC(O)—,

D is a substituted or unsubstituted hydrocarbylene,

R$^1$, R$^2$, R$^3$, R$^4$, R$^5$ and R$^6$ are each substituted or unsubstituted hydrocarbyl and x, y and z each have a value from 0 to 100 with the proviso that:

(a) the mole ratio of the dianhydride (1) to the total diamine present [the diamine groups conferred by (2) and (3)] is about 1:1, and (b) the amount of diaminopolysiloxane (3) present is about 1 to about 20 mole % of the total diamine present.

There is thus provided polyimidesulfone and polyimideketone compositions which possess the combination of good mechanical properties, good thermal resistance, good solvent resistance and good processability. For example a typical material claimed in this invention exhibits a modulus of about 520,000 psi and a Tg of about 220° to 230° C. The resultant polymer has the processing characteristics of a thermoplastic material with a modulus expected only in a thermoset. For comparison an excellent thermoset, Araldite MY 720 (Ciba-Geigy Co.) cured wth diaminodiphenylsulfone, for example, exhibits the following properties: Tensile Modulus @25° C.=540,000 psi and @150° C.=380,000 psi Tensile Strength @25° C.=8,540 psi and @150° C.=6,460 psi Efforts have been made to use aliphatic siloxanes to improve the pocessability of the polyimidesulfones and polyimideketones. The data obtained indicate that these modified materials have significantly lowered glass transition temperature, thermal stability and solvent resistance. It is therefore unexpected that the use of the aforementioned siloxane compound, within the narrow limits specified allow the retention of all of the key properties of the polyimidesulfones and polyimideketones before modification with the polysiloxanes. This is especially true in the light of the teaching of S. Maudgal and T. L. St. Clair in an article entitled "Siloxane-Containing Polyimides with Improved Processability" published in the Proceedings of the Second International Conference on Polyimides, Ellenville, N.Y. (1985).

The preferred dianhydride used in preparing the polyimidesulfones and polyimideketones of this invention is 3,3',4,4'-benzophenonetetracarboxylic acid dianhydride. In addition to substituting: —S—, —SO$_2$— or a valence bond for the carbonyl bridge between the two phenyl groups, some limited modification of the arene moieties can be made. For example, a naphthalene ring can be substituted for the benzene ring. It is also possible to replace the benzene ring with equivalent heterocyclic compounds, such as, thiophene, furane or pyrrole.

The two radical residua of (2) and (3) can be randomly distributed throughout the polyimide with that of (1) or they can be present as groups or blocks of (1) and (2) and (1) and (3) in the backbone structure.

The preferred diaminodiaryl compound for preparing polyimidesulfones is 3,3'-diaminodiphenylsulfone. The preferred diaminodiaryl compound for preparing polyimideketones is 3,3'-diaminobenzophenone.

Some latitude exists in the points of attachment of functional groups on the ring moieties. The meta relationship between ring substituents is highly preferable because it results in increased chain flexibility which in turn affords enhanced processability. The ring substituents may also be in the para position.

The preferred diaminopolysiloxanes are those having the structure:

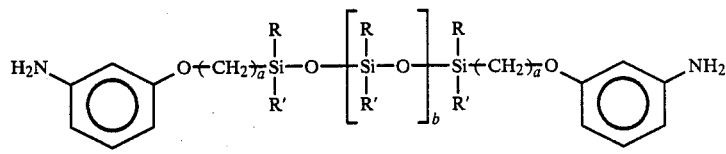

where R and R' are each an alkyl group having 1 to about 6 carbon atoms or a phenyl radical, such as, bis(m-aminophenoxybutyl)-hexadecamethyloctasiloxane.

In the practice of this invention, it is preferred to carry out the synthesis of the siloxane-modified polyimidesulfone and polyimideketone in two steps. First, a polyamic acid is produced by the interaction of anhydride and amino groups. The polyamic acids are then imidized by heating at elevated temperatures of over 200° C. which eliminates water and effects ring closure of the polyamic acid to imide groups. The dried polyimides are then used for molding various shaped articles.

Although the amount of diaminopolysiloxane can constitute about 1 to 20 mole % of the total diamine present, it is preferred to use at least about 5 mole % to about 15 mole %.

Even though maximum polymer molecular weight is obtained when the mole ratio of dianhydride to total diamine content is about 1:1, a ratio in the range of about 0.90–1.1:1 also provides useful polyimidesulfone and polyimideketone compositions albeit of lower molecular weight.

The polysiloxane-modified polyimidesulfones and polyimideketones of this invention can be used to form composites by formulating various fillers into them. Suitable fillers include boron fibers, carbon fibers, glass fibers, polyester fibers (including liquid crystalline polyesters), Kevlar fibers (trademark of du Pont), cementitious compounds, silicon carbide, silicon nitride, and Tedlar(trademark of du Pont), as well as various high modulus organic fibers, as for example polybenzothiazoles, polybenzimidazoles, and the like.

The criticality of the nature and ratios of the components of the polysiloxane modified-polyimidesulfones and polyimideketones of this invention is demonstrated by the unsatisfactory results obtained when substitutes are made. For example, if an alkylene group is used for X in the dianhydride, the resultant polyimidesulfone or polyimideketone loses solvent resistance.

The quantitative amounts of the components of these polysiloxane-modified polyimidesulfones and polyimideketones are also critical.

While the polyimidesulfones disclosed in U.S. Pat. No. 4,398,021 are described in U.S. Pat. No. 4,489,027 as being processable, J. F. Dezern et al. (cited above) reveals in scrim cloth binding experiments that flow occurred prior to imidization and fell to neglible figures after imidization.

The molding compositions of this invention, in contrast, are processable (flow) in the imidized state and do not change their chemical structure during the molding operation. These modified polyimidesulfones and polyimideketones, therefore, truly constitute an advance over the prior art compositions referred to above.

The term "processable" or "processability" means capable of being changed in shape by thermal mechanical operations such as molding.

The compositions of this invention are adaptable to such molding techniques as compression molding, injection molding, transfer molding, thermoforming, and the like.

The invention is further described in the examples which follow. All parts and percentages are by weight unless otherwise specified.

EXAMPLE 1

Preparation of Precursor Polyamic Acid

Into a 5000 ml resin kettle equipped with a high speed stirrer, nitrogen inlet, thermometer, condenser and heating mantle was placed 1,447 g of diglyme (used as received from Grant Chemical Division of Ferro Corporation—Baton Rouge, La.) followed by 318.3 g (1.28 mol, 99.4% purity) of 3,3'-diaminodiphenylsulfone (used as obtained from FIC Corporation San Francisco, CA). This material was washed in with 222 g of dry diglyme. The mixture was stirred for 10 minutes to obtain a clear solution. Then 129.6 g (0.1418 mol, 3.5% diamine) of bis(m-aminophenoxybutyl)-hexadecamethyloctasiloxane was slowly added to the solution with vigorous mixing. This material was washed in with 143 g of diglyme. The reaction was heated to 35° C. and 462.0 g (1.418 mol, 98.8% purity) of previously dried (170° C. overnight in a circulating air oven) 3,3',4,4'-benzophenonetetracarboxylic acid dianhydride (commercially available from Allco Chemical Corp. as special grade) was slowly added to the solution over 1 hour with stirring. Exotherming took place on addition and the temperature increased to ca. 35° C. The dianhydride was washed in with 311 g of diglyme. The reaction mixture was kept at 35° C. with rapid stirring for 5 hours. The solution was cooled under a flow of nitrogen and was filtered through ten sheets of polyester cloth (commercially available from Tekko Inc., Elmsford, NY—Swiss Monofilament Polyester Screen Recap, Fabric #7-470T-Orange). The filtered solution was stored in a tightly closed container under nitrogen at 4° C.

EXAMPLE 2

Preparation of Precursor Polyamic Acid

Into a 5000 ml resin kettle equipped with high speed stirrer, nitrogen inlet, thermometer, condenser and heating mantle was placed 1,499 g of diglyme followed by 300.6 g (1.205 mol, 99.4% purity) of 3,3'-diaminodiphenylsulfone. This material was washed in with 230 g of diglyme. The mixture was stirred for several minutes to obtain a clear solution. Then 194.4 g (0.2126 mol, 3.5% amine) of the diaminopolysiloxane (See Example 1) was slowly added to the solution with vigorous stirring. The material was washed in with 148 g of diglyme. The reaction was heated to 35° C. and 462.0 g (1.418 mol, 98.8% purity) of previously dried (170° C. overnight in a circulating air oven) 3,3',4,4'-benzophenonetetracarboxylic acid dianhydride was added over a one hour period with rapid stirring. Exotherming took place and the solution temperature increased to 35° C. The dianhydride was washed in with 322 g of diglyme. The reaction mixture was kept at 35° C. with rapid stirring for 5 hours. The solution was cooled under a nitrogen flow and was filtered through ten sheets of polyester cloth (See example one for specifications). The filtered solution was stored in a tightly closed container under nitrogen at 4° C.

EXAMPLE 3

Preparation of Precursor Polyamic Acid

Into a 1000 ml three neck flask equipped with a high speed stirrer, nitrogen inlet tube, thermometer, condenser and heating mantle was placed 298 g of diglyme followed by 76.9 g (0.309 mol, 99.6% purity) of 3,3'-diaminodiphenylsulfone. This material was washed in with 50 g of diglyme. The mixture was stirred for several minutes to obtain a clear solution. The solution was heated to 35° C. and 105.7 g (0.325 mol, 99% purity) of previously dried (170° C. overnight in a circulating air oven) 3,3',4,4'-benzophenonetetracarboxylic acid dianhydride was added over a one hour period with rapid stirring. Exotherming took place upon addition and the temperature was controlled at 35° C. The dianhydride was washed in with 75 g of diglyme. Then 14.94 g (0.0163 mol, 3.48% amine) of the diaminopolysiloxane used in Example 1 was slowly added over a period of 20 minutes. The amine was washed in with 38 g of diglyme. The reaction was stirred rapidly for 3 hours at 35° C. The solution was then cooled and filtered through 10 sheets of polyester cloth (See Example 1 for specifications). The filtered solution was stored in a tightly closed container under nitrogen at 4° C.

EXAMPLE 4

Comparative Example of Precursor Polyamic Acid

Into a 5000 ml resin kettle, equipped with a high speed stirrer, a continuous nitrogen blanket, heating mantle, thermometer and condenser was placed 1297 g of diglyme followed by 353.7 g (1.4175 mol, 99.4% purity) of 3,3'-diaminodiphenylsulfone. This material was washed in with 327 g of dry dyglyme. The mixture was stirred for 10 minutes until a clear solution was obtained. Then 462.0 g (1.418 mol, 98.8% purity) of previously dried (170° C. overnight in a circulating air oven) benzophenonetetracarboxylic acid dianhydride was slowly added to the solution over one hour with stirring. Some exothermimg took place and the temperature of the solution rose to 35° C. The dianhydride was washed in with 279 g of dry diglyme. The reaction was heated at 35° C. for 5 hours with rapid stirring. It was then cooled under nitrogen flow and filtered through ten sheets of polyester cloth (See example one for specifications). The filtered solution was stored in a tightly closed container under nitrogen at 4° C.

EXAMPLE 5

Precipitation and Imidization of the Precursor Polyamic Acids

The 30% solids solution from the Examples 1, 2 and 3 was diluted to 15% solids by the slow addition of diglyme with continuous stirring. The polyamic acid was precipitated by the addition of the dilute solution to water. A 1000 ml dropping funnel was half filled with 15% solution. This solution was slowly added dropwise to a stirred Waring blendor (capacity of 4 liters) filled with 3 liters of distilled water. The white polyamic acid precipitate was filtered using a Buchner funnel and washed a minimum of three times with distilled water to remove diglyme. The wet polyamic acid was placed in a tray and was air dried overnight. The material was then dried in a circulating air oven at 100° C. for 2–4 hours and then at 225° C. for 0.5–4 hours. The dried product was dry pulverized in a Waring blender into a fine pale yellow powder. The powder was dried overnight in a vacuum oven at 120° C. and 25 inches of Hg prior to molding.

Molding of Polysiloxane-modified Polyimidesulfones

The mold was preheated to 320° C. (the mold must have tight tolerances and should provide uniform pressure in all dimensions). The hot powder was placed into the mold and compressed in order to completely fill the mold. The mold was then closed at touch pressure (20–40 psi) and the temperature raised to 320° C. After 10 minutes at 320° C., pressure was increased slowly to 250 psi. The pressure and temperature were held for 45 minutes. The heat was then shut off and the mold was cooled with an air-water mist while still maintaining pressure at 250 psi. Cooling continued until the mold temperature dropped to 160° C. The pressure was then released and the plaque removed. The plaques prepared from materials made in Examples 1 and 2 were translucent brown with minimal voids. The material from Example 4 did not coalesce properly and would not form a uniform plaque even when higher temperatures and pressures were used.

The mechanical properties of plaques molded from the polysiloxane modified polyimidesulfones obtained from the polyamic acids prepared in Examples 1, 2 and 3 are collated in the Table below.

| Modified Polyimidesulfone Mechanical Properties | | | | | | |
|---|---|---|---|---|---|---|
| | Example 1 | | Example 2 | | Example 3 | |
| Tensile | 25° C. | 177° C. | 25° C. | 177° C. | 25° C. | 177° C. |
| Modulus, psi(a) | 520 | 310 | 440 | 200 | 560 | 280 |
| Strength, | — | 4.3 | 3.5 | 1.9 | 7.0 | 3.2 |
| psi(a) | | | | | | |
| Elongation, % | 7.6 | 11.0 | 8.6 | 7.4 | 9.6 | 9.5 |
| Density(b) | 1.36 | | 1.34 | | — | — |
| Tg | — | | — | | 240° C. | |

(a) × 1000
(b) grams per cubic centimeter

Solvent Resistance of the Plaques

The plaques from Examples 1 and 2 were weighed and immersed into containers of N-methylpyrrolidone. The solvent with plaque immersed was stirred for 2 weeks. The plaques were removed, washed with distilled water and blotted dry. Weights of the plaques were obtained. No change in weight was observed after solvent exposure. The solvent exposed plaques had no cracks or other visible signs of degradation.

EXAMPLE 5

Preparation of a Composite from Carbon Fiber and Polysiloxane Modified Polyimidesulfone Several 8 inch×8 inch pieces of CELION (trademark of BASF) 6000 carbon fiber woven cloth (eight harness satin) are dipped into the solution prepared in Example 2 after dilution to 15% solids in diglyme. The cloth is dried for one hour and then dipped a second time into the solution and air dried again. The cloths are then dried at 100° for one hour in a circulating air oven followed by drying at 220° C. for 2–4 hours. Five pieces of the impregnated cloth are placed between porous mat bleeders (two pieces of glass above and two pieces below) and then the construction is placed in a KAPTON (trademark of du Pont) film bag. The bag is evacuated to 15 psig and then placed in an autoclave. Heat and pressure are applied slowly until a temperature of 320° C. and a pressure of 200 psi are obtained. This condition is maintained for 10–15 minutes. The autoclave is cooled to room temperature, pressure released and the composite removed. The composite obtained has a lower void content than a composite that is prepared with unmodified polyimidesulfone.

EXAMPLE 6

Preparation and Molding of a Polysiloxane-modified Polyimideketone

The procedure of Example 1 is used to prepare a polysiloxane-modified polyimideketone polyamic acid with the exception that the 3,3'-diaminodiphenylsulfone is replaced by an equivalent amount of 3,3'-diaminobenzophenone (available from Mitsui Toatsu, Japan). As in Example 1, the diaminopolysiloxane is bis(m-aminophenoxybutyl)-hexadecamethyloctasiloxane. The resulting polyamic acid is precipitated, dried and imidized as described in Example 4. Molding of this material is carried out at lower pressures than a product not modified with polysiloxane. A molded plaque of this material is not attacked by N-methyl-2-pyrrolidone.

Although the invention has been described with a certain degree of particularity, it is understood that the present disclosure has been made only by way of example and the numerous changes can be made without departing from the spirit and scope of the invention.

We claim:

1. A thermoplastic molding composition for fabricating articles having good solvent resistance, physical and mechanical properties at high temperatures comprising an amorphous, normally solid polysiloxane-modified polyimidesulfone or polyimideketone containing repeating imidization radical residua of:

(1) a dianhydride having the generic formula:

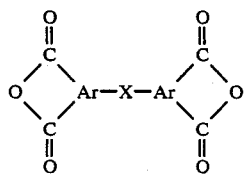

wherein

X is at least one of >C=O, —O—, —SO$_2$— or a valence bond; and

Ar is an arylene group having 6 to about 10 carbon atoms;

(2) a diaminodiaryl compound having the generic formula:

wherein Ar is as defined above and Y is >C=O or —SO$_2$—; and (3) a diaminopolysiloxane having the generic formula:

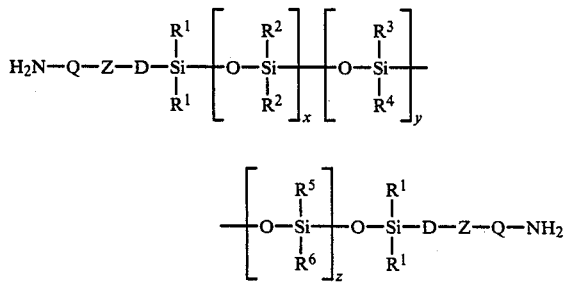

wherein Q is a substituted or unsubstituted aromatic group,

Z is —O—, —S—, —SO—, —SO$_2$—, —SO$_2$NH—, —NHSO$_2$—,

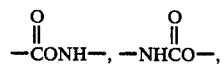

—C(O)O— or —OC(O)—,

D is a substituted or unsubstituted hydrocarbylene,

R$^1$, R$^2$, R$^3$, R$^4$, R$^5$ and R$^6$ are each substituted or unsubstituted hydrocarbyl and x, y and z each have a value from 0 to 100; with the following provisos:

(A) the mole ratio of the dianhydride (1) to the total diamine present, the groups conferred by (2) and (3), is about 1:1, and (B) the amount of diaminopolysiloxane (3) present is about 1 to 20 mole % of the total diamine present.

2. The molding composition claimed in claim 1 wherein X is >C=O, Ar is phenylene and Y is —SO$_2$—.

3. The molding composition claimed in claim 1 wherein X is >C=O, Ar is phenylene and Y is >C=O.

4. The molding composition claimed in claim 1 wherein the two radical residua of (2) and (3) are randomly distributed throughout the polyimide with the radical residuum of (1).

5. The molding composition claimed in claim 1 wherein the radical residua in the polyimide are present as blocks or groups of (1) and (2) and (1) and (3).

6. The molding composition claimed in claim 1 wherein X is —O—, Ar is phenylene and Y is SO$_2$.

7. The molding composition claimed in claim 1 wherein X is —O—, Ar is phenylene and Y is >C=O.

8. The molding composition claimed in claim 1 wherein X is O, Ar is phenylene and Y is —SO$_2$—.

9. The molding composition claimed in claim 1 wherein each of R$^1$ and R$^2$ is methyl and y and z are each O.

10. The molding composition claimed in claim 1 wherein each of R$^1$ and R$^2$ is phenyl and y and z are each O.

11. The molding composition claimed in claim 1 wherein R$^1$ is methyl and R$^2$ is phenyl and y and z are each O.

12. The molding composition claimed in claim 1 wherein X is a valence bond, Ar is phenylene and Y is >C=O.

13. The molding composition claimed in claim 1 wherein Q is phenylene.

14. The molding composition claimed in claim 1 wherein Z is —O—.

15. The molding composition claimed in claim 1 wherein D is a hydrocarbylene having 4 carbon atoms.

16. The molding composition claimed in claim 1 containing a filler.

17. The molding composition claimed in claim 16 wherein the filler is carbon fiber.

18. The molding composition claimed in claim 16 wherein the filler is glass fiber.

19. The molding composition claimed in claim 16 wherein the filler is a powdered metal.

20. The molding composition claimed in claim 16 wherein the filler is an aromatic polyamide.

21. The molding composition claimed in claim 16 wherein the filler is a liquid crystalline polyester.

22. The molding composition claimed in claim 16 wherein the filler is a silicon nitride.

23. The molding composition claimed in claim 1 wherein the amount of diaminopolysiloxane present is about 10 to 15 mole % of the total diamine present.

* * * * *